United States Patent
Wolff

[15] 3,655,993
[45] Apr. 11, 1972

[54] OPTICALLY ROTATORY DIELECTRIC-GUIDED PARAMETRIC OSCILLATORS

[72] Inventor: Peter Adalbert Wolff, Berkeley Heights, N.J.

[73] Assignee: Bell Telephone Laboratories, Incorporated, Murray Hill, N.J.

[22] Filed: July 10, 1970

[21] Appl. No.: 53,839

[52] U.S. Cl. ................................307/88.3; 331/96
[51] Int. Cl. .....................................H03f 7/00
[58] Field of Search........................307/88.3; 331/96

[56] References Cited

UNITED STATES PATENTS 3,571,607  3/1971  Giordmaine.....................307/88.3

Primary Examiner—Roy Lake
Assistant Examiner—Darwin R. Hostetter
Attorneys—R. J. Guenther and Arthur J. Torsiglieri

[57] ABSTRACT

There is disclosed a parametric oscillator having reduced optical loss and increased interaction pathlength because it employs an optically rotatory liquid in a capillary tube of lower refractive index and of internal diameter of the order of one micrometer. The pumping beam is launched off-axis into the liquid to generate signal and idler beams such that all three beams at any given point propagate in intersecting directions and yet are guided along the capillary tube. Each beam is reflected at the capillary wall with at least a minimum angle Φ from the normal to the glass, such that sin Φ is greater than the ratio of the index of refraction of the glass to the index of refraction of the liquid.

3 Claims, 2 Drawing Figures

Patented April 11, 1972 3,655,993
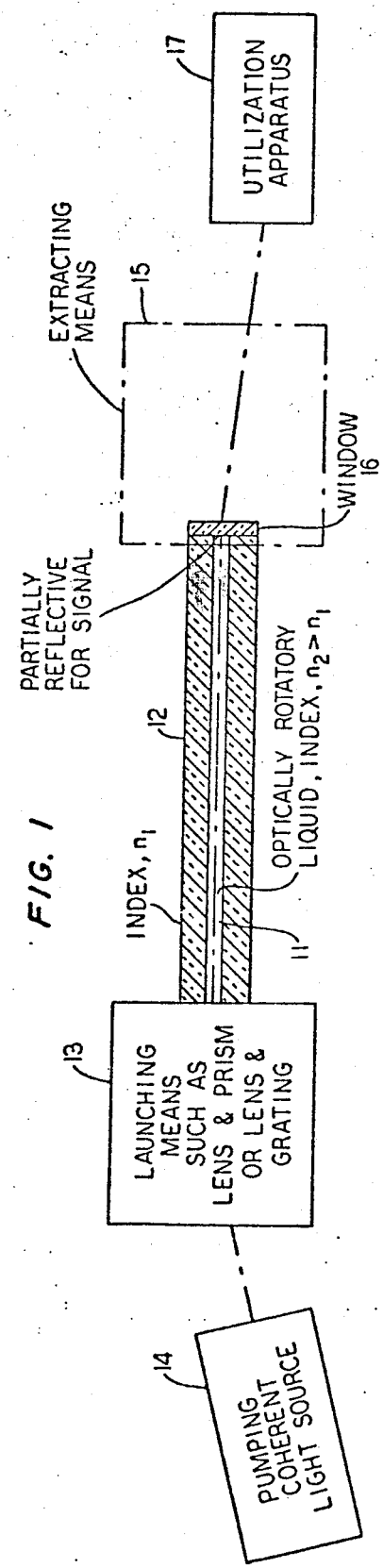
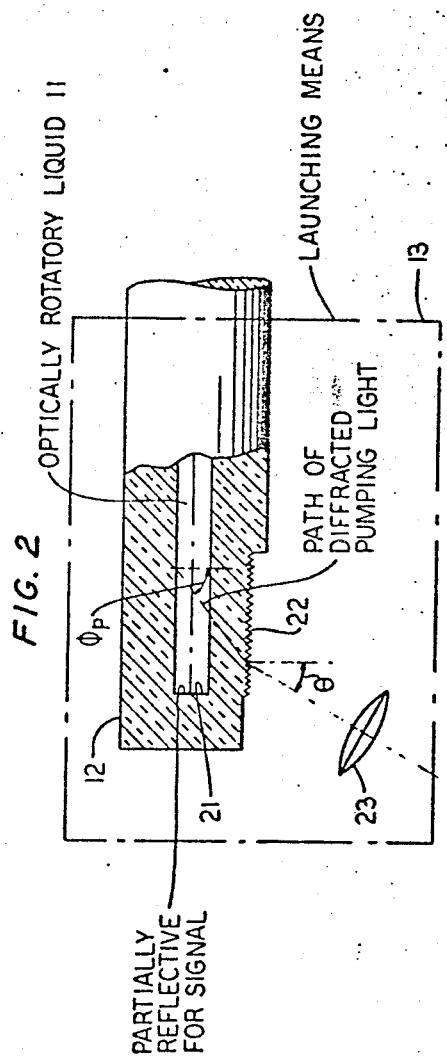
INVENTOR
P. A. WOLFF
BY Wilford L. Wisner
ATTORNEY

OPTICALLY ROTATORY DIELECTRIC-GUIDED PARAMETRIC OSCILLATORS

BACKGROUND OF THE INVENTION

This invention relates to optical frequency shifters, particularly optical parametric oscillators.

An optical parametric oscillator is an optical frequency shifter employing a low-loss nonlinear effect that enables difference-frequency mixing of two supplied beams or enables generation of signal and idler beams from a single supplied pumping beam. The sum of the signal and idler frequencies is equal to the pump frequency for a so-called second order nonlinear effect.

The active element in a conventional optical oscillator is a nonlinear optical crystal having dimensions typically about 1 = 1 × 1 centimeters. Parametric oscillation is difficult to achieve for the following reasons:

1. Nonlinear crystals with low loss are rare. Particularly rare are nonlinear crystals with large nonlinear coefficients; such crystals include lithium niobate ($LiNbO_3$) and barium sodium niobate ($Ba_2NaNb_5O_{15}$).

2. The interaction pathlengths are limited fundamentally by the divergence of a focused laser beam because of diffraction. Beyond this, interaction pathlengths are further limited unless the interacting beams are phase-matched, so that power is extracted continuously from the pumping beam along the interaction path, and unless the interacting beams propagate collinearly.

The problems of interaction pathlength can be overcome by using an appropriately selected dielectric guide to confine the radiation.

Nevertheless, guides of appropriate dimensions are difficult to fabricate from crystals; and, even if they could be, the losses would still be high.

SUMMARY OF THE INVENTION

My invention overcomes the foregoing problems by employing an optically rotatory liquid of relatively high refractive index in capillary tubes of relatively low-index glass.

More specifically, since the nonlinear mixing properties of such liquids are such that the interacting traveling waves do not propagate collinearly on a local scale, the ratio of the index of refraction of the glass to the index of refraction of the liquid must be at least as small as $\sin \Phi$, where $\Phi$ is the minimum angle of propagation from the normal by any of the three waves at incidence on the glass.

According to a feature of my invention, the pumping beam is launched obliquely into the guide to enable the signal and idler, which propagate in mutually intersecting directions to each other and to the pumping beam, to propagate at angles at least as large as $\Phi$ from the normal to the glass. Such propagation enables the electric fields all to be nonparallel to each other to supply the nonlinear interaction.

BRIEF DESCRIPTION OF THE DRAWING

A more complete understanding of my invention may be gained from the following detailed description, taken together with the drawing, in which:

FIG. 1 is a partially pictorial and partially block diagrammatic illustration of one embodiment of the invention; and FIG. 2 is a pictorial showing of an illustrative launching means for the embodiment of FIG. 1.

DESCRIPTION OF ILLUSTRATIVE EMBODIMENT

In the embodiment of FIG. 1, the nonlinear interaction takes place in the optically rotatory liquid 11 contained in or flowed through the glass capillary tube 12 of illustratively 2 micrometers internal diameter and index of refraction $n_T = 1.5$, approximately.

Means 13 are provided for launching coherent light from a pumping source 14 into the guide formed by liquid 11 and tube 12. Launching means 13 could take a number of alternative forms, such as simply a lens and a window at the end of tube 12, a lens and prism or a lens and grating, such as the combination shown in FIG. 2. In any case, the pumping light is focused into liquid 11 obliquely to the axis of tube 12.

Means 15 are provided for extracting the interacting waves from the guide for use in a utilization means 17, which is any device in which variable frequency input light is desired. The extracting means can be organized from the same type of components as launching means 13, but to provide the inverse function; or extracting means 15 could simply be a transparent window at the end of tube 12. It could also include appropriate filters for removing residual pumping light from the useful output or for passing only one of the signal and idler light beams.

In addition, and in any desired combination with any of the foregoing alternatives, launching means 13 and extracting means 15 could include suitable reservoirs and mechanisms for flowing liquid 11 through tube 12.

The liquid 11 could be any of the optically-active liquids shown by J. A. Giordmaine et al., U.S. Pat. Nos. 3,389,269 and 3,390,278, to be useful in nonlinear optical devices. See also P. M. Rentzepis et al., Physical Review Letters, 16, 792 (1966) and J. A. Giordmaine et al., J. de Chemie Physique, 1, 215 (1967). Among these, I prefer a solution of arabinose in water, illustratively a 3-molar solution, for which the nonlinear susceptibility $\chi \sim 10^{-10}$ esu and the index of refraction $n_T = 1.6$.

For this liquid 11, the pumping source 14 is chosen to be an argon ion gaseous laser operating at 514.5 nanometers.

Other illustrative parameters of the embodiment of FIG. 1 are length of tube 12, 1 meter; overall loss per pass of the liquid 11 in tube 12, about 5 percent; and the launching means 13 and extracting means 15 include partial reflective coatings on the end windows therein. These coatings are selected to resonate the signal and idler, illustratively differing substantially in frequency.

In the operation of the embodiment of FIG. 1, I compute a threshold for parametric oscillation of about 10 milliwatts of pumping power actually injected into liquid 11.

The achievement of this threshold of oscillation and of useful power output at the signal or idler frequency when the launched pumping power exceeds threshold depend upon the achievement of phase matching.

If the launched pumping beam in liquid 11 bounces back and forth from the glass walls at the angle $\theta$ from the normal, as indicated in FIG. 2, the signal and idler directions of propagation will automatically adjust themselves to those angles of propagation in the forward direction which will not only cause them to be internally reflected in the guide, but also to be phase-matched to the pumping beam. All three waves will propagate in intersecting directions; and no pair of their electric fields will be parallel to each other. Both a signal and an idler will extract energy from the pumping beam. The nonlinear polarization relationship for either the signal or idler wave, for example, at a frequency $\omega_3$ can be written in terms of the difference frequency, $\omega_1 - \omega_2$, of the other two waves, as follows:

$$P_3(\omega_3) = P_3(\omega_1 - \omega_2) = \chi [E_1(\omega_1) \times E_2(\omega_2)],$$

where $\chi$ is a nonlinear susceptibility, and $E_1$ and $E_2$ are fields at frequencies $\omega_1$ and $\omega_2$, respectively, $(\omega_3 = \omega_1 - \omega_2)$.

Illustratively, for the parameters disclosed above, the angle $\Phi$, for the pumping wave with respect to the normal to the glass wall is chosen to be about 70°.

It will be noted that the ratio of the index of the glass to the index of the liquid in the illustrative example is appreciably less than unity so that all three waves in the guide can make rather similar angles with respect to the normal to the glass wall, for example, about 70° and still have $\sin \Phi$ greater than that ratio. The angle $\Phi$ will nearly always be larger than 45°.

In FIG. 2, the launching means 13 includes an end surface 21 for tube 12 which serves only as a reflector at the signal and idler frequencies and further includes a grating 22 upon which the lens 23 focuses the pumping beam from source 14. The grating 22 can be blazed in any desired manner so that for a given input angle $\theta$ of the focused beam at grating 22, the first order diffracted light propagates at the angle $\Phi_p$ with respect to the normal to the tube wall.

The grating 22 is formed on a flat surface in a cutaway portion of the side wall of tube 12.

It should be clear from the foregoing description that the described launching means and the arabinose liquid 11 employed is only one of many possible liquids within the generic class of optically rotatory liquids. It may be specifically noted that the chemical formula for arabinose is $C_5H_{10}O_5$.

I claim:

1. An apparatus for parametrically generating an electromagnetic wave for utilization, comprising a dielectric capillary tube having a first index $n_1$ of refraction, an optically rotatory liquid contained in said capillary tube, said liquid having a substantial nonlinear coefficient for three interacting single-frequency electromagnetic waves including the wave to be generated and propagating in mutually intersecting directions in said liquid, said liquid having a second index of refraction $n_2$ related to said first index according to $n_1/n_2 \leq \sin \Phi$ where $\Phi$ is the minimum incidence angle of any of said waves with respect to the normal at said tube, and means coupled to said tube for supplying to said liquid oblique to the axis of said tube one of said waves other than said wave to be generated to enable phase-matching of said waves and to provide the nonlinear interaction.

2. An apparatus according to claim 1 in which the ratio $n_1/n_2$ is less than unity, the means for supplying one of the waves to the liquid comprising means for launching said wave into said liquid at an angle with respect to the normal to the tube greater than about 45° and less than 90°.

3. An apparatus according to claim 2 including means for resonating a generated wave in said liquid, the launching means comprising a grating disposed in a side wall of the tube.

* * * * *